United States Patent Office 3,265,793
Patented August 9, 1966

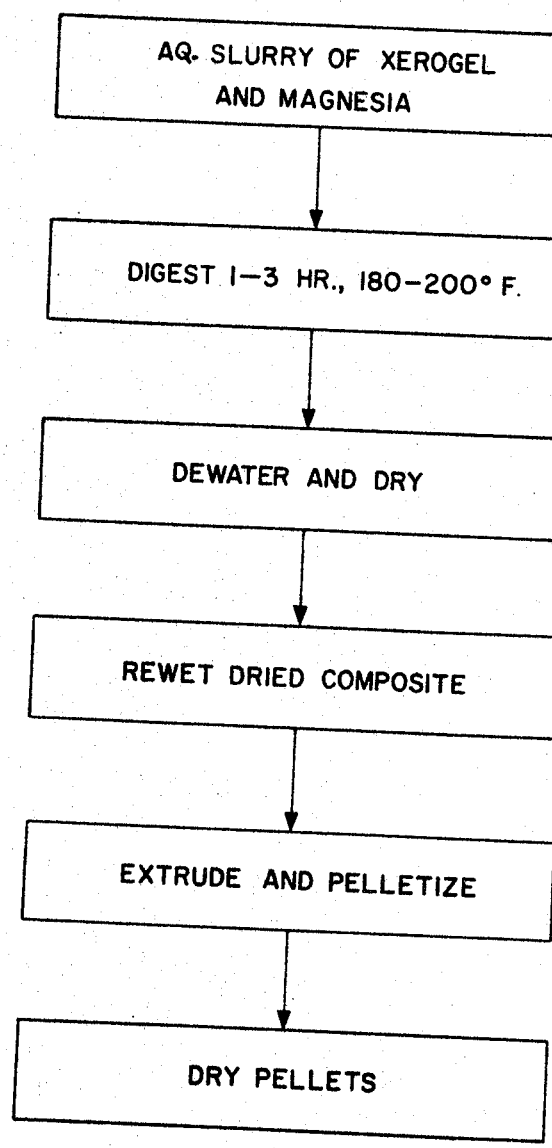

3,265,793
PROCESS FOR PRODUCING EXTRUDED XEROGELS CONTAINING MAGNESIA PARTICLES
Robert R. Otremba, Chicago, Ill., assignor to Nalco Chemical Company, Chicago, Ill., a corporation of Delaware
Filed Aug. 16, 1963, Ser. No. 302,703
4 Claims. (Cl. 264—141)

This invention, in general, pertains to preparation of extruded xerogel masses. More particularly, the invention relates to preparation of extruded masses such as silica-magnesia cracking catalysts, alumina-magnesia masses, silica-alumina-magnesia catalysts, etc., wherein wetted particles in the form of a plastic mass are extruded into the form of rods, pellets or the like.

It has been discovered, in accordance with the instant invention, that the use of particular types of magnesium oxide employed in the manufacture of xerogel extrusions imparts different and unusal properties to the extruded masses. One area of improvement lies in the benefits obtained in extrusion of the cracking catalyst microspheres to form the rods or the like.

Extrusion is a process wherein a powdered xerogel or the like is admixed with sufficient water to produce a plastic mass which may be extruded through a die of any size or shape. The extrudate is cut or broken off at regular intervals to form pellets or rods of any desired length. A good extrusion operation seldom requires the addition of a solid lubricant and thus eliminates the necessity for burning out the lubricant from the finished catalyst pellets or rods.

Some catalytic materials such as silica-alumina and silica-magnesia and materials such as silica or alumina do not possess sufficient plasticity as a wet mix to be effectively extruded. It has been considered necessary to tablet such materials by compressing the material in dies to form a tablet or pill. In accordance with this invention, such materials may be compounded with a particular type of magnesium oxide to provide a readily extrudable mass in order to form extruded rods or pellets. The pellets or rods obtained from this operation retain a favorable catalytic activity, absorbency, and hardness.

Heretofore, the extrusion of a powdered cracking catalyst, especially of the silica-magnesia type, was very difficult. The difficulty manifested itself in one of the following ways, either undersized pellets, inability of the microspheres to deform under extrusion and form a cohesive pellet or rod of inherent strength, and/or the cracking and breaking of otherwise whole pellets to produce what is commonly referred to as "fines." Other mechanical difficulties were encountered, such as plugging of the die. The plugging of the die results in excessive "down" time of the extruding machine, increasing labor maintenance costs and providing a decreased production rate. All of these factors contribute toward a commercially unfeasible operation.

Some of the aforementioned difficulties encountered in extruding silica-magnesia type catalysts may be minimized by resorting to tabletting processes for production of the catalysts. However, this operation is much more costly than an extrusion operation.

Furthermore, the use of extrusion or pelleting aids have been utilized to overcome some of the difficulties. Examples of such extrusion aids are clays, hydrogenated peanut oil, charcoal, etc. These extrusion aids are incorporated with the material being extruded to facilitate the extrusion. However, when using an extrusion aid of an organic nature, it is necessary to fire the extruded pellets at high temperatures (often greater than 1200° F.) to burn out the organic material. For cracking catalysts, and especially cracking catalysts of the silica-magnesia type, firing at these elevated temperatures can cause sintering of the catalyst mass. When certain clays are used to facilitate extrusion, the resulting catalytic or absorbent properties of the pellets may be affected by a dilution factor. Hence, these common extrusion aids are not the best answer toward solving the extrusion problem of catalysts of the silica-magnesia type.

The magnesium oxide ordinarily used to prepare a silica-magnesia type cracking catalyst or carrier is a technical grade magnesium oxide. This material is sometimes identified as a light burn or calcined magnesite. A catalyst or carrier made with this type of magnesium oxide is extremely difficult to extrude. These extrusion difficulties are overcome, in accordance with this invention, by using a source of magnesium oxide identified in the trade as USP grade magnesia. The resultant catalyst rods or pellets have satisfactory physical and catalytic properties.

The quantity of the USP grade magnesia employed in the xerogel mass comprises 5–35% by weight of the mass, dry basis. In the silica-magnesia type catalysts, the amount preferably is in the order of 15–35% magnesia based on the weight of the catalyst (dry basis). The catalyst particles which are extruded in the latter instance preferably are spray-dried silica particles and magnesia particles which are wetted with sufficient water to make the mixture of a plastic nature suitable for extrusion. The quantity of water employed in making plastic xerogel-magnesia mass is in the order of 35–55%, based on the weight of the wet mass.

In addition to providing successful extrudates of the silica-magnesia type, the invention can also be applied to the extrudation of silica-alumina-magnesia type cracking catalysts. In the latter case, the silica content of the catalysts constitutes 50–90% silica as $SiO_2$. The alumina portion of the catalyst constitutes 5–40% by weight alumina, as $Al_2O_3$. The magnesia portion of the catalyst constitutes 5–30% by weight magnesia, as MgO, all on a dry basis.

In the case of alumina-magnesia extrudates, the magnesia preferably comprises 15–35% by weight of the total weight of alumina and magnesia, dry basis.

The drawing is a flow diagram of the two methods described immediately hereafter.

In the preparation of catalyst materials using the unique type of magnesium oxide herein described, two methods may be employed. These methods can be generally described as follows. A dried silica xerogel, dried alumina xerogel or alumina hydrate, or a dried silica-alumina xerogel, in the form of small particles such as are obtained by the spray drying of a hydrogel thereof, is purified by water washing and the like, then slurried with water and heated to 150° F. A slurry of magnesium oxide is added and the combined slurries are digested for 1-3 hours at 180-200° F. The slurry is then dewatered and dried. The filter cake can either be completely or partially dried at 212° F. In most cases, however, the cake is dried until at least some semblance of a free flowing powder results.

In another technique for preparation, a silica hydrogel, alumina hydrogel, or a silica-alumina hydrogel is prepared in the conventional manner and the hydrogel slurry is heated to 150° F. A magnesium oxide slurry is added, and the combined slurries are heated for 1-3 hours at 180-200° F. The slurry is then dewatered and may thereafter be spray dried. The dried catalyst mass is then purified with water in order to remove the soluble salts. After purification the material is dried at 212° F. until a free flowing powder is obtained.

The silica-magnesia catalysts or carrier material, or silica-alumina-magnesia catalysts or carrier material, or alumina-magnesia carrier material is prepared for extrusion by wetting or incorporating about 35-55% water with the material in a suitable mixer such as a Muller or Simpson mixer. The materials are blended until the water is evenly dispersed throughout the material. Generally the free moisture content in the wetted material found to be most expedient for extrusion is in the order of 40-50%, with 44-46% being the most expedient for a silica-magnesia type material. The pellets are predried at 300° F. after extrusion through a die. If additional strength is desired, the pellets are dried at 950-1000° F.

USP grade magnesia is distinguished from technical grade magnesia in that the former has a much higher surface area and pore volume than the latter. The magnesia used in the practice of this invention should have a surface area of at least 100 sq. meters per gram and a pore volume of at least 0.20 cc. per gram. Physical properties of samples of USP grade magnesia are listed below:

Table II

| Text No. | Sample Description | Strength (lbs.) | Comments on Ease of Extrusion Process |
|---|---|---|---|
| 1 | Silica xerogel | | Could not extrude, die plugged, etc. |
| 2 | Alumina hydrate (Alcoa C-31). | | Do. |
| 3 | Silica xerogel plus technical grade MgO. | 3 | Extremely difficult, die plugged, etc. |
| 4 | Silica xerogel plus technical grade MgO plus, 10% clay. | 5 | Difficult to extrude much fines produced. |
| 5 | Silica xerogel plus USP Grade MgO, 34.9% MgO. | 8 | Good extrusion characteristics. Pellets dried at 350° F. |
| 6 | Silica xerogel plus USP Grade MgO, 34.9% MgO. | 20 | Good extrusion characteristics. Pellets dried at 350° F., and 1000° F. |
| 7 | Silica xerogel plus USP Grade MgO, sample No. 2. | 13 | Do. |
| 8 | Silica xerogel plus USP grade MgO, 15% MgO. | 9 | Fairly good extrusion characteristics. |
| 9 | Silica hydrogel plus USP grade MgO, 24.4% MgO. | 8.5 | Do. |
| 10 | Silica hydrogel plus technical grade MgO, 33% MgO. | | Could not extrude, die plugged, etc. |

It will be seen from the above table that successful extrudates have been made by using this type of magnesium oxide and a conventional silica-alumina type cracking catalyst. Also, a successful extrudate of 30% magnesia and 70% hydrated alumina (ALCOA C-31) was obtained. A conventional silica-alumina cracking catalyst and hydrated alumina, such as described, by themselves are extremely difficult to extrude. The extrusion of these materials with the technical grade magnesium oxide or magnesia similar to it were extremely difficult. The strength of the resulting pellets in Table II is expressed in pounds necessary to crush a pellet $\frac{1}{8}''$ in diameter by

Table I

| Sample Description | B.E.T. Surface Area (m.²/gm.) | Pore Volume (c.c./gm.) | ABD (gm./c.c.) | Average Particle Size (Micron) | Average Crystallite Size-$D_{200}$ (A) | Impurities (Max.) | | | |
|---|---|---|---|---|---|---|---|---|---|
| | | | | | | $SiO_2$ (Percent) | CaO (Percent) | Iron Oxide (Percent) | $Al_2O_3$ (Percent) |
| USP Grade: | | | | | | | | | |
| High activity | 122 | 0.31 | 0.10 | <1 | 70 | <.1 | 0.4 | .02 | |
| 2d sample | 132 | | | <1 | ~70 | 0.2 | 1.0 | .05 | |
| 3rd sample | 120 | 0.32 | | <1 | ~70 | <.1 | | | .15 |

The abbreviation B.E.T. Surface Area in the foregoing table refers to the Brunauer-Emmett-Teller method for determining surface area as published in the Jour. Am. Chem. Soc., vol. 60, page 309 (1938). See also the text Catalysis, vol. 1, Emmett, Reinhold Publishing Company, 1954. The abbreviation ABD means apparent bulk density. The designation "$D_{200}$" designates the mean distance expressed as diameter of the crystallite along the 200 plane. See X-Ray Diffraction Procedures, by Klug and Alexander, chaper 9, published by John Wiley and Sons.

The following table is a summary of the pellet strength and ease of extrusion of various magnesia-containing xerogels. All of the preparations used in the tests were made by the hot slurry digestion technique heretofore described. This technique of preparation is as follows: A purified and dried xerogel was slurried with water and heated to 150° F. A slurry of magnesium oxide was added and the combined slurries were digested for two hours at 180°-200° F. The slurry was dewatered and dried. The filter cake was dried at 212° F. until a semblance of a free flowing powder resulted. The powder was mixed with water to form a plastic mass and extruded.

$\frac{1}{8}''$ in length. The values listed are usually the average of 20 pellets. The observations are those made during each experimental extrusion.

The invention is hereby claimed as follows:

1. A process for producing an extruded xerogel which comprises wetting a xerogel containing 5-35% magnesia particles having a surface area of at least 100 square meters per gram and a pore volume of at least 0.20 cc. per gram with water to form an extrudable, wet, plastic mass, and extruding the said plastic mass through an extrusion die to form pellets.

2. A process for producing an extruded silica xerogel which comprises wetting a silica xerogel containing 15-35% magnesia in the form of USP grade magnesia with water to form an extrudable, wet, plastic mass, and extruding the said plastic mass through an extrusion die to form pellets, and drying said pellets.

3. A process for producing an extruded silica-alumina xerogel which comprises wetting a silica-alumina xerogel containing 5-30% magnesia in the form of USP grade magnesia with water to form an extrudable, wet, plastic mass, and extruding the said plastic mass through an extrusion die to form pellets, and drying said pellets.

4. A process for producing extruded hydrated alumina which comprises wetting hydrated alumina containing 15-35% magnesia in the form of USP grade magnesia with water to form an extrudable, wet, plastic mass, and extruding the said plastic mass through an extrusion die to form pellets, and drying said pellets.

References Cited by the Examiner

UNITED STATES PATENTS

| | | | |
|---|---|---|---|
| 2,485,249 | 10/1949 | Weir | 264—143 |
| 2,517,707 | 8/1950 | Payne | 264—143 |
| 2,604,662 | 7/1952 | Bodkin | 264—141 |
| 2,627,089 | 2/1953 | Norwood | 264—148 |
| 2,941,961 | 6/1960 | Braithwaite | 262—455 |
| 3,010,914 | 11/1961 | Braithwaite et al. | 262—455 |
| 3,066,354 | 12/1962 | Chaffee et al. | 262—148 |

FOREIGN PATENTS 635,274   1/1962   Canada.

ROBERT F. WHITE, *Primary Examiner.*

ALEXANDER H. BRODMERKEL, *Examiner.*

S. HELLER, *Assistant Examiner.*